United States Patent

Van Rysselberghe

[11] Patent Number: 6,000,795
[45] Date of Patent: Dec. 14, 1999

[54] EYEGLASS RETAINER

[76] Inventor: Pierre C. Van Rysselberghe, 745 NW. Culpepper Ter., Portland, Oreg. 97210

[21] Appl. No.: 09/114,784

[22] Filed: Jul. 13, 1998

Related U.S. Application Data

[60] Provisional application No. 60/052,513, Jul. 14, 1997, provisional application No. 60/062,665, Oct. 8, 1997, and provisional application No. 60/086,377, May 22, 1998.

[51] Int. Cl.$^6$ .................................................. G02C 5/14
[52] U.S. Cl. .......................................... 351/123; 351/157
[58] Field of Search .................................. 351/122, 123, 351/157

[56] References Cited

U.S. PATENT DOCUMENTS

| | | | |
|---|---|---|---|
| D. 32,274 | 2/1900 | King | 351/123 |
| Re. 34,836 | 1/1995 | Murrell | 351/123 |
| D. 199,503 | 11/1964 | Davis | 351/123 |
| D. 371,154 | 6/1996 | Kalbach | D16/306 |
| 538,151 | 4/1895 | Bussey | 351/123 |
| 756,871 | 4/1904 | Marshutz | 351/123 |
| 1,524,321 | 1/1925 | Stevens et al. | 351/123 |
| 1,743,796 | 1/1930 | Nelson | 351/23 |
| 1,966,717 | 7/1934 | Green | 351/123 |
| 2,031,771 | 2/1936 | Grier | 351/123 |
| 2,229,568 | 1/1941 | Hodgkins | 351/123 |
| 2,294,840 | 9/1942 | Dunn | 351/123 |
| 2,389,428 | 11/1945 | Glasser | 351/123 |
| 2,502,734 | 4/1950 | Lyons | 351/123 |
| 2,561,402 | 7/1951 | Nelson | 351/123 |
| 2,626,538 | 1/1953 | Frum | 351/123 |
| 3,266,111 | 8/1966 | Abel | 351/123 |
| 3,684,356 | 8/1972 | Bates | 351/123 |
| 3,874,776 | 4/1975 | Seron et al. | 351/123 |
| 3,917,387 | 11/1975 | Ensing | 351/123 |
| 3,953,114 | 4/1976 | Bidgood | 351/123 |
| 4,133,604 | 1/1979 | Fuller | 351/123 |
| 4,136,934 | 1/1979 | Seron | 351/157 |
| 4,657,364 | 4/1987 | Murrell | 351/156 |
| 4,662,729 | 5/1987 | Dobson | 351/123 |
| 4,732,465 | 3/1988 | Field | 351/123 |
| 4,790,646 | 12/1988 | Seron | 351/156 |
| 4,848,861 | 7/1989 | McCulley | 351/123 |
| 5,002,381 | 3/1991 | Murrell | 351/123 |
| 5,054,903 | 10/1991 | Jannard et al. | 351/123 |
| 5,076,681 | 12/1991 | Lhospice | 351/115 |
| 5,137,342 | 8/1992 | Jannard et al. | 351/123 |
| 5,235,355 | 8/1993 | May | 351/123 |
| 5,575,042 | 11/1996 | Kalbach | 24/123 V |

FOREIGN PATENT DOCUMENTS

| | | |
|---|---|---|
| 0 588 216 A1 | 3/1994 | European Pat. Off. . |
| 2280097 | 2/1976 | France .................................. 351/123 |

*Primary Examiner*—Huy Mai
*Attorney, Agent, or Firm*—Kolisch, Hartwell, Dickinson, McCormack & Heuser

[57] ABSTRACT

A device for securing eyeglasses on a person's head. A pair of elastomeric retainers are secured along temples of a pair of eyeglasses for positioning behind a person's ears.

35 Claims, 5 Drawing Sheets

EYEGLASS RETAINER

CROSS-REFERENCE TO RELATED APPLICATIONS

This application claims priority from U.S. Provisional patent application Ser. No. 60/052,513, filed Jul. 14, 1997, U.S. Provisional Patent Application Serial No. 60/062,665, filed Oct. 8, 1997, and U.S. Provisional Application Serial No. 60/086,377, filed May 22, 1998, each of which is hereby incorporated by reference.

FIELD OF THE INVENTION

The invention relates to devices and methods for holding a pair of glasses on a person's head. The invention applies to many types of glasses including sunglasses, reading glasses, driving glasses, safety glasses and sport glasses.

BACKGROUND OF THE INVENTION

For centuries people have worked to solve the problem of securing eyeglasses comfortably on a wearer's head. There is a natural tendency for glasses to slip down the wearer's nose and face, from their optimal location with the lenses positioned in front of the wearer's eyes. The problem is exacerbated when glasses are worn during vigorous activities such as running or cycling, or when the wearer has fluid such as sweat, make-up, or lotion around the eyes and upper part of the nose where glasses typically rest.

The most common device used today to secure eyeglasses on a person's head is a strap worn behind the wearer's head, connecting distal tips of the two eyeglass temples. However, eyeglass straps are not always preferred or appropriate. Some people do not want the visibility of a strap. At work or formal events, an eyeglass strap may be distracting or may appear too casual. Other times a strap may be undesirable because of the effect it has on the wearer's hair. Another problem with eyeglass straps is that they usually require two hands to remove. Eyeglasses with straps also can be difficult to fit into an eyeglass case. Thus, there is a need for alternatives to an eyeglass strap for retaining eyeglasses on a person's head.

A number of eyeglass retainers have been designed that use a narrow semirigid hook mechanism behind the ear to resist forward movement of the temple. For example, some eyeglasses have "wrap-around" temples with end portions that are thin wire gauge extenders curved to wrap around the back of the wearer's ear. The wrap-around temple is designed to fit in the crease where the ear and head connect. However, temples with permanent wrap around tips rarely fit in the right spot because the eyeglass frames are usually not customized. If the wrap-around portion is too far back then the glasses slide forward before the hook meets the ear. If the wrap-around portion is too far forward then the spring-like wire exerts excessive pressure behind the ear causing discomfort.

Modifications of traditional wrap-around temples are disclosed in U.S. Pat. No. 2,626,538 and U.S. Pat. No. 5,002,381, each of which discloses an add-on accessory for an eyeglass temple including a tube portion that slides over the distal tip of a temple for placement along the temple in relation to the wearer's ear. A hook member extends down from the tube portion presenting a concave surface for positioning in the crease behind the wearer's ear and resisting forward movement of the eyeglasses.

An inherent problem with hook-shaped eyeglass retainers is that functionally they rely on direct forward pressure applied behind the ear in a relatively small and highly sensitive area where the ear meets the head. The hook-shaped retainer must be relatively stiff in the front-to-back direction, otherwise, the retainers fail to hold the eyeglasses in place. Some hook-shaped retainers may function acceptably for the purpose of securing eyeglasses, but over time they cause irritation behind the ear, which is probably why such retainers are not more widely used today.

Another problem with accessory retainers such as the ones disclosed in U.S. Pat. Nos. 2,626,538 and 5,002,381 is that the tube portions are insufficiently flexible to fit over a wide range of temple dimensions. The thickness and shape of eyeglass temples vary dramatically. Eyeglass temples may be small gauge wire extensions with a round cross-section, as in aviator glasses, or they may be large plastic braces such as the temples of a RAY BAN WAYFARER®. The tube portions of prior accessory retainers such as those mentioned above are not versatile enough to fit on temples that vary over a wide range of cross-sectional dimensions.

Another approach to retaining eyeglasses is to use temples that clamp the head. This design may work satisfactorily for extremely lightweight eyewear on some head sizes. However, the clamping force required to secure most glasses for extended periods will eventually cause discomfort. It is also difficult to pre-set a clamping force that will achieve the retention goal comfortably on a wide range of head sizes. This is a significant limitation because most eyeglass frames are not customized for a particular person.

Even though the problem of securing eyeglasses has been worked on diligently by many people for many years, a need still exists for a comfortable, flexible, inexpensive, universal eyeglass retainer that is unobtrusive and does not require an around-the-head tensioning strap.

SUMMARY OF THE INVENTION

The invention provides a simple mechanism for retaining eyeglasses on a person's head. The retention device is simpler to use, easier to make, more adaptable to varying individual anatomies, more comfortable to wear, more versatile for use on different shapes and sizes of eyeglasses, and more aesthetically acceptable than eyeglass retention devices used in the past.

A pair of eyeglass tethers are provided for securing eyeglasses on a person's head. Each tether has an elastomeric attachment mechanism providing a hole for receiving an eyeglass temple. A traction portion descends from the attachment mechanism, and is freely bendable in a front-to-back direction so that the traction portion can grip a person's back ear region without concentrating significant forward pressure in the crease where the ear meets the head.

Eyewear includes a pair of lenses supported in a front frame member. A pair of temples are connected to opposite ends of the frame member. The temples extend rearward for bracing the eyeglasses on a wearer's head. Each of a pair of retainers has an elastomeric traction portion descending from one of the temples. The traction portion is freely yielding in a front-to-back direction, and has a surface that grips a wearer's back ear region.

An eyeglass retention device includes a pair of retainers. Each retainer has an upper edge, and an attachment mechanism near the upper edge including a hole for receiving a temple on a pair of eyeglasses. Each retainer has an elasometic traction portion from the temple. Each traction portion has a width and a thickness, the width being substantially equal to or greater than the thickness. Another eyeglass retention device includes a pair of retainers. Each retainer has an upper edge, and attachment mechanism near the upper edge including a hole for receiving a temple on a pair of sunglasses, and a resiliently flexible traction portion. The front face of the traction The invention also provides and eyeglass retention device including an elongate member having a long axis running between top and bottom opposite ends. A hole is provided near the top end for receiving an eyeglass temple. A handle is located near the bottom end. The member has a surface that tends to grip on skin, and is resiliently stretchable along the long axis so that when the member is stretched from an eyeglass temple into a wearer's back ear region by pulling on the handle, the member grips and maintains a partially stretched orientation causing a front-to-back pulling force to be exerted on the temple without concentrating significant forward pressure behind a wearer's ear when used to secure eyeglasses on a wearer's face. In another embodiment, eyewear includes a pair of eyeglasses which have two temples, and a pair of foam rubber sheet members. Each sheet member is defined between substantially planar and parallel front and back sides. Each sheet member has a hole connecting the front side to the back side. Each of the temples is inserted through the hole of one of the sheet members so that the front sides of the sheet members face generally forward when the eyeglasses are worn.

Another eyeglass retention system includes a pair of tethers. Each tether has an upper edge and an attachment mechanism providing a whole near the upper edge for receiving an eyeglass temple. Each tether has an elastomeric traction portion below the attachment mechanism. The hole of each tether defines a front-to-back direction. The traction portion of each tether lacks significant stiffness in the respective front-to-back direction.

Retainers employ a pair of tethers, each tether having an upper edge, and an attachment mechanism including a hole near the upper edge for receiving an eyeglass temple. Each tether has an elastomeric traction portion decending from the hole of the attachment mechanism. The traction portion is made of a flat elastomeric sheet. The sheet has a thickness, oriented in a front-to-back direction, of less than about ⅜ inch, and width equal to or greater than the thickness.

DESCRIPTION OF THE INVENTION

The invention provides a soft, flexible retainer member for suspension from an eyeglass temple. The retainer is versatile for use on eyeglass temples of varying dimensions. The retainer employs static friction to maintain its position behind a person's ear, rather than relying primarily on a forward pressuring member to hook rigidly behind the ear. Consequently, the retainer can be worn for long periods of time without discomfort. The retainer is particularly useful for eyeglass retention during sporting events, such as running or biking in which eyeglasses are especially prone to being dislodged from their optimal position. The retention device is also well-suited for use on prescription glasses that often contain relatively heavy glass lenses, and are worn for long periods of time. There are many embodiments of the invention, as exemplified in the figures and description below.

Figures 1, 2A, 2B, 3A, 3B, 3C, 3D:
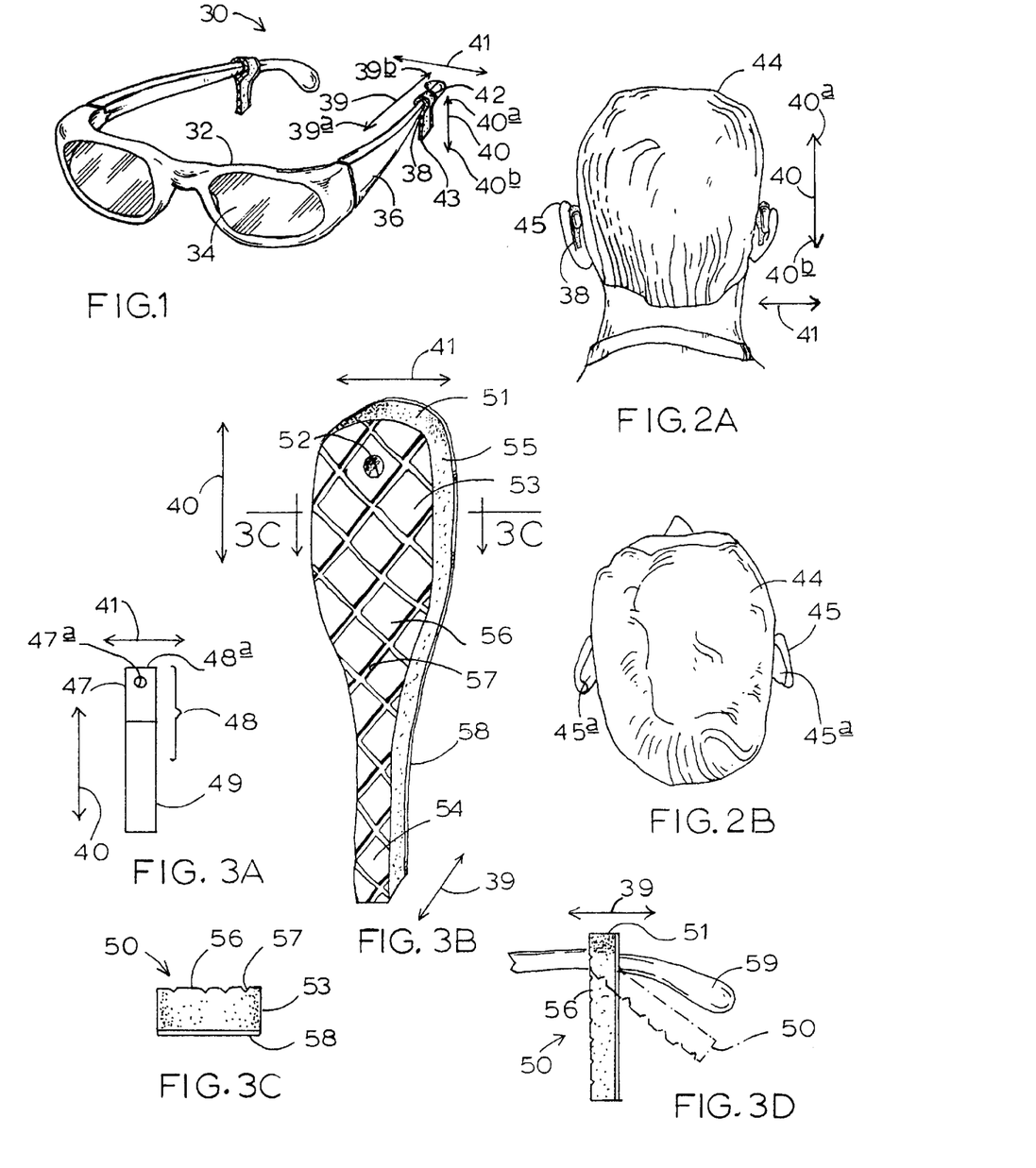
FIG. 1 is a perspective view of a pair of eyeglasses with retainers according to an embodiment of the present invention.
FIG. 2A is a view of the back of a person's head showing retainers positioned behind the person's ears.
FIG. 2B is a view of the top of a person's head showing the person's back ear regions.
FIG. 3A is a schematic view of a retainer according to the present invention.
FIG. 3B is a perspective view of a preferred embodiment of the present invention.
FIG. 3C is a cross-sectional view through the retainer shown in FIG. 3B.
FIG. 3D is a side view of a retainer mounted on an eyeglass temple.

FIG. 1 illustrates a pair of eyeglasses 30 with retainers for securing the glasses on a person's head. Eyeglass frame 32 holds lenses 34. Temples 36 extend rearward for mounting on the sides of a person's head and resting on the bridge between a person's ear and head. Retainer 38 is mounted on temple 36 at an appropriate location along the length of temple 36 so that retainer 38 nestles behind the person's ear in a comfortable manner while anchoring, or even pulling to some extent, the lens portion of the glasses against the person's face in the desired wearing position. Retainers of the present invention may also be referred to as "tethers" because, unlike prior retention devices, the invented retainers act like flexible leashes binding each temple to an ear.

Arrows in FIG. 1 show relative directions that are referred to throughout the specification and claims. Line 39 defines a "front-to-back" direction substantially parallel to temple 36. Arrow 39a points to the front, and arrow 39b points to the back. Line 40 defines the gravitational direction sometimes referred to as up 40a and down 40b. Line 41 defines a lateral direction perpendicular to up-down direction 40 and substantially parallel to the plane of lenses 34. Lateral direction 41 is also referred to as a side-to-side direction. One way of thinking about the defined directions is that they relate to a person's head, as shown in FIG. 2, who is wearing eyeglasses 30. Throughout the specification and claims, terms are used to describe various retainer embodiments relative to the defined directions. For example, edge 42 of retainer 38 may be referred to as an "upper edge." Similarly, edge 43 may be referred to as a "lower edge." A portion of retainer 38 that is below upper edge 42 may be referred to as "descending" from upper edge 42.

FIG. 2A shows the back of a person's head who is wearing glasses with retainers such as the ones shown in FIG. 1. Retainer 38 is wedged or nestled between the back of ear 45 and the side of head 44 also referred to as the "back ear region." Top views of back ear regions 45a are shown in FIG. 2B.

FIG. 3A shows components of a retainer embodiment of the invention relative to up-down direction 40 and side-to-side direction 41. Retainer 46 includes an attachment mechanism 47 providing a hole 47a for receiving an eyeglass temple. Attachment mechanism 47 is preferably made of an elastomeric material such as neoprene that is sufficiently stretchable so that hole 47a can be enlarged to accommodate eyeglass temples of varying dimensions, however, small enough, in combination with the frictional characteristics of attachment mechanism 47, to remain stationary along a temple during normal eyeglass use. In a preferred embodiment, hole 47a has an area of about 0.0031 in$^2$ when it is unstretched, and an ability to stretch over a temple portion cross-sectional area of about 0.047 in$^2$. By selecting an appropriate elastomer and dimension, the hole can stretch resiliently around a temple portion having a cross-sectional area of at least about five times the unstretched area of the hole.

Neoprene with fabric backing on one side works well for manufacturing the invented retainers. Suitable neoprene materials can be obtained from Rubitex Corp. under the product numbers 931, G-231n and R-1400n. Neoprene thicknesses that have been tried successfully range from ⅛ inch to ⅜ inch. For these neoprene materials the ⅛ inch and ⅜ inch dimensions appear to establish approximate critical limits. A thickness of less than ⅛ inch results in insufficient gripping capacity. Whereas, a thickness of more than ⅜ inch renders the retainer insufficiently yielding in the front-to-back direction causing a less comfortable fit.

Traction portion 48 descends from upper edge 48a and is dimensioned to grip a person's back ear region. Traction portion 48 may include, and be integrated with, attachment mechanism 47, or may be a separate piece. Handle 49 descends from traction portion 48 to provide a handle to pull on when the glasses are initially put on. Retainer 46 can be made of a single elastomeric unit that frictionally engages a person's back ear region without applying forward pressure in the crease where the head meets the ear. When the glasses are put on, handle 49 is pulled on and then released. The pulling step stretches retainer 46 before it grips so that the retainer ends up gently pulling the glasses toward the person's face, resulting in a snug, comfortable fit.

FIG. 3B shows a preferred embodiment of the invention. Retainer 50 has an upper edge 51. An attachment mechanism including hole 52 located near upper edge 51 is provided for receiving an eyeglass temple. Traction portion 53 descends from upper edge 51 and hole 52. Handle 54 descends from traction portion 53. Lateral sides or edges 55 of traction portion 53 have a surface texture that tends to grip and resist slipping when pressed against skin. For example, traction portion 53 may be made of a highly compressible, soft, foam rubber. Lateral edges 55 are created by cutting the foam rubber so that an open-cell surface texture is exposed, resulting in a good gripping capability. The open-cell surface also has the advantage of absorbing moisture such as sweat while maintaining its capacity to grip on skin. Front face 56 of retainer 50 has an array of criss-cross grooves 57 which increase surface area and may enhance the traction or gripping characteristics of the front side of traction portion 53. Many other types of treads or texturing features may be similarly employed to improve the gripping capacity of traction portion 53. For example, front face 56, which is designed to face forward toward the eyeglass lens, in contact with a person's back ear region, may use a tread design such as those used on automobile tires, or may also use a tread similar to a hiking or running shoe sole, for example a nob or "waffle" pattern. Fabric backing 58 is affixed to the back side of retainer 50 to provide stability.

FIG. 3C shows a cross-sectional view through retainer 50. Traction portion 53 has front face 56. Grooves 57 are created in front face 56 for enhancing gripping.

FIG. 3D shows a side view of retainer 50 mounted on temple 59 with front face 56 directed toward eyeglass lenses (not shown). In solid lines retainer 50 descends substantially perpendicular to the long portion of temple 59. Retainer 50 is also shown in dashed lines bent in a front-to-back direction parallel to temple 59, which is a typical orientation for retainer 50 when temple 59 is placed behind the user's ear, and retainer 50 is pulled into position in a person's back ear region. Upper edge 51 is placed above, or slightly forward of the crest of the connection between the ear and the head. This results in an added benefit of cushioning and/or lightening the load of the temple on the ear.

In a preferred embodiment, the side-to-side width of traction portion 53 is approximately ⅜ inch. It is important that the side-to-side width of traction portion 53 be sufficient to exert lateral opposing pressures against the user's head on one side, and the back of the ear on other side. However, the width should be limited so that it does not noticeably push the ear outward from its usual position.

The length of retainer 50 from upper edge 51 to the opposite tip of handle 54, is approximately 1⅝ inches. Increased length of handle 54 makes retainer 50 easier to manipulate. However, it is important for the length of handle 54 to be short enough so that it substantially hides behind the ear, i.e., does not extend appreciably beyond the perimeter of the ear. The narrow taper of handle 54 minimizes its visibility while increasing its longitudinal elasticity. When retainer 50 is used, handle 54 substantially hides under the distal tip of temple 59, and remains easily accessible for tightening the fit.

Front face 56 of traction portion 53 is planar which helps to prevent retainer 50 from focusing forward pressure in the sensitive crease area behind the user's ear. The same objective of avoiding concentrated direct forward pressure, is achieved by selecting a soft resiliently compressible foam rubber material that freely bends in a front-to-back direction, as illustrated in FIG. 3D.

Figure 3E:
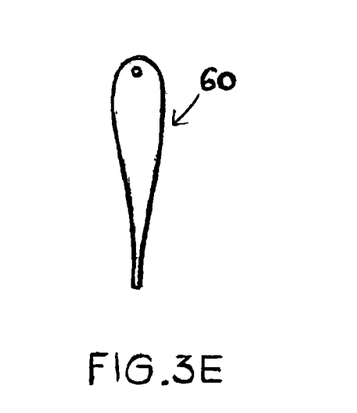
FIG. 3E is a front view of a retainer having a modified peripheral shape.

FIG. 3E shows a retainer 60 similar to retainer 50, except with a smoothly curved peripheral shape.

Figure 4:
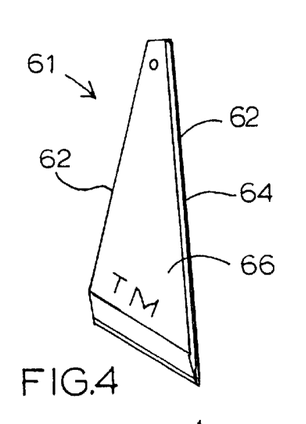
FIGS. 4–6 are perspective views of other embodiments of the invention.

FIG. 4 illustrates another embodiment of the invention. Retainer 61 has an outer edge 62 that is shorter than inner edge 64. Retainer 60 is designed so that inner edge 64 will rest against the user's head while outer edge 62 rests against the back of the user's ear. This design increases the amount of friction created between the retainer and the user's ear and head while tapering the shape in order to minimize its visibility, i.e., preventing the retainer from visibly protruding beyond the circumference of the user's ear. Trademark logo 66 may be placed on the back side of sheet member 61 so that it is visible from a viewpoint behind the user's head.

Figure 5:
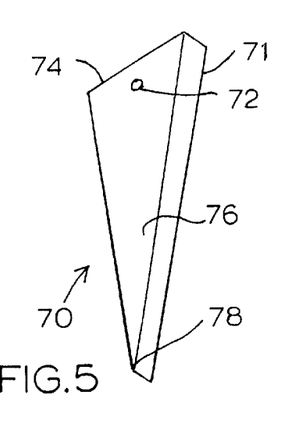

In FIG. 5, retainer 70 has an isosceles triangular shape. Hole 72 is positioned near upper edge 74. Sheet member 71 has a maximum width at upper edge 74 and tapers with a narrowing width through handle 76 to the tip of lower edge 78.

Figure 6:
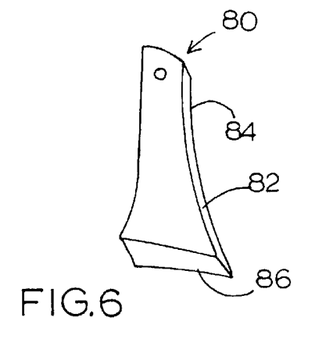

FIG. 6 shows a variation of the retainers described so far. Retainer 80 has curved edges 82 resulting in a bell-shaped design. The bell-shaped design allows some increase in the elasticity of upper portion 84, while maintaining a fairly wide handle 82. One can appreciate that there are many different ways of contouring the edges of a foam rubber sheet member to follow the contours of the back of a person's ear while achieving the desired friction, comfort and retention goals.

Figure 7:
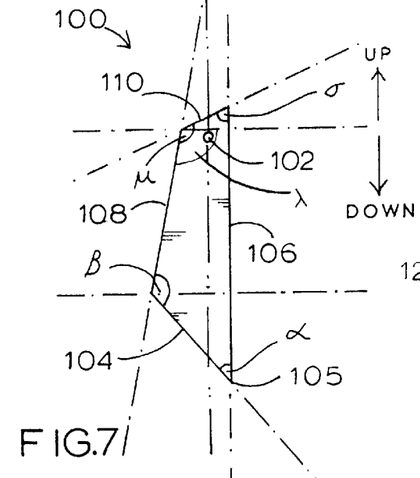
FIG. 7 is a back view of an embodiment of the invention.

FIG. 7 shows another embodiment of the invention. The view is taken toward the back of retainer 100, i.e., toward the back of the wearer's head (not shown), the retainer being designed for use on the left temple of a pair of eyeglasses for positioning behind the wearer's left ear. Retainer 100 has a hole 102 for receiving the distal tip of the left temple of the eyeglasses (not shown). Lower edge 104 tapers toward tip 105 which is adjacent the wearer's head. Inner lateral edge 106 is adjacent the wearer's head when worn and is the longest of the four sides of the retainer. Outer lateral edge 108 is shorter than edge 106 and is positioned adjacent the backside of the wearer's left ear. Lateral edge 108 is short enough so that it does not extend beyond the periphery of the wearer's ear. Upper edge 110 of retainer 100 is close to hole 102, the shortest side of the retainer. Upper edge 110 should be sufficiently short so that the retainer does not noticeably push out the upper portion of the wearer's ear.

Dimensions and ranges for the design shown in FIG. 7 are as follows. Hole 102 has a diameter in the range of 1/32 inch to 3/16 inch, preferably about 1/16 inch. Edge 104 has a length in the range of ½ inch to 1⅛ inches, preferably about 15/16 inch. Side 106 has a length in the range of 1½ inches to 2½ inches, preferably about 2 1/16 inches. Side 108 has a length in the range of ¾ inch to 1½ inches, preferably about 1¾ inches. Upper edge 110 has a length in the range of 5/16 inch to 9/16 inch, preferably about 7/16 inch. Angle $\alpha$ is approximately 40-degrees. Angle $\sigma$ is approximately 67-degrees. Angle $\beta$ is approximately 127-degrees. Angle $\mu$ is approximately 125-degrees. Angle $\lambda$ is in the range of 95-degrees to 110-degrees, preferably about 101-degrees. The thickness of retainer 100 is in the range of ⅛ inch to ⅜ inch, preferably about 3/16 inch.

Figure 8:
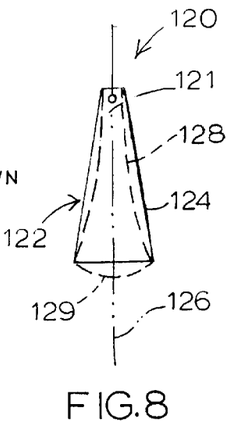
FIG. 8 is a front view of another retainer embodiment.

In FIG. 8, retainer 120 includes sheet member 121 which has side 122 that is equal in length to opposite side 124. Sheet member 121 has side-to-side symmetry relative to axis 126. The symmetry feature of retainer 120 is advantageous for at least the following two reasons. First, retainer 120 can be used on the left temple or the right temple of a pair of eyeglasses. In other words, each of a pair of retainers are identical to each other. Accordingly, they are easier to manufacture because only one piece configuration has to be manufactured instead of two. Second, the retainers are easier to use because the vendor does not have to educate the user about which retainer goes on which side.

FIG. 8 also shows a variation of symmetrical sheet member 121, in dashed line 128. Modified sheet member 128 is more elastic in its upper portion because of its narrowed width. Sheet member 128 also has a curved lower edge 129 for enhancing the manipulation function of the lower portion.

Figure 9A:
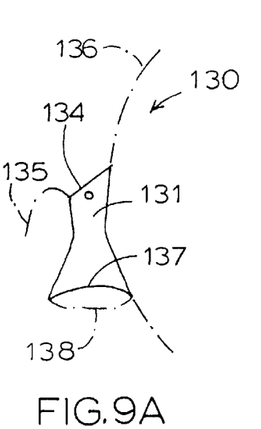
FIGS. 9A, 9B and 10 illustrate alternative retainer shapes.
Figure 9B:
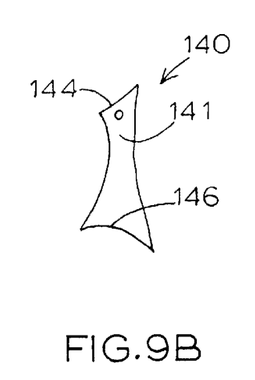

FIGS. 9A and 9B illustrate different retainer shapes. In FIG. 9A, retainer 130 includes sheet member 131. Upper edge 134 is tapered so that it has a lower profile next to ear 135 and extends higher adjacent head 136. Again, the objective is to substantially conceal the retainer from view, at least when the wearer is being viewed from the front, while maximizing static friction between the retainer and the wearer's ear and head. Also shown in FIG. 9A is a possible curved lower edge 138 similar to the variation already shown and described in FIG. 8. In FIG. 9B, retainer 140 includes sheet member 141 with upper edge 144 similar to edge 134 in retainer 130. Retainer 140 is substantially the same as retainer 130 except that lower edge 146 is tapered so that it is shorter next to the wearer's ear, while extending slightly further down the side of the wearer's head. Both of retainer's 130 and 140 are designed for use behind the wearer's left ear, assuming that the retainer design shown in FIGS. 9A and 9B are rear views.

Figure 10:
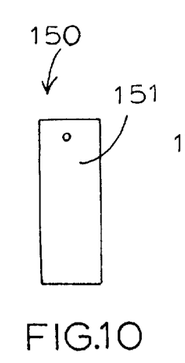

FIG. 10 shows retainer 150 including sheet member 151 which is substantially rectangular. Sheet member 151 is symmetrical, similar to retainer 120 of FIG. 8, but it is less conforming to the anatomical topography behind a person's ear.

Figures 13A, 13B:
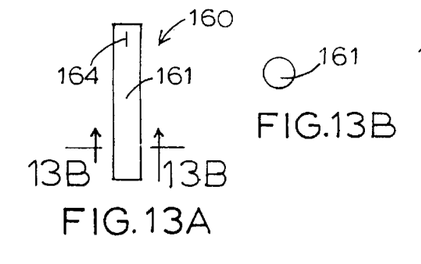
FIG. 13A is a front view of another retainer.
FIG. 13B is a cross-sectional view through the retainer shown in FIG. 13.

FIGS. 13A and 13B show different views of another embodiment of the invention in which retainer 160 includes cylindrically-shaped elastomeric cord member 161. Retainer 160 also employs slit 164, instead of a hole as shown in previously described embodiments. FIG. 13A shows a cross-section through cord member 161 illustrating its cylindrical shape.

Figure 11:
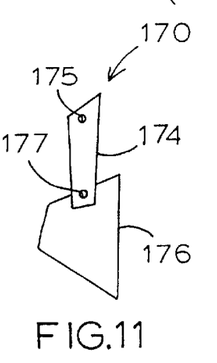
FIGS. 11 and 12 are front views of eyeglass retainers employing different temple attachment mechanisms.
Figure 12:
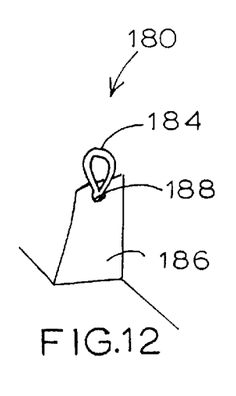

FIGS. 11 and 12 illustrate embodiments of the invention in which different materials and dimensions are used for the temple attachment portion versus the anchoring portion. In FIG. 11, retainer 170 includes an upper link 174 including hole 175 for receiving the left temple of a pair of eyeglasses. Link 174 is attached to anchor portion 176 by rivet 177. The material for link 174 can be selected for the primary purpose of the desired elastomeric and friction properties relative to the expected range of eyeglass temples that retainer 170 could be used on. At the same time, the material and dimensions for anchor portion 176 can be selected primarily for the purpose of achieving the desired comfort and static friction properties relative to the user's back ear region.

Similarly, in FIG. 12, retainer 180 includes a rubber ring member 184 connected to anchor portion 186 via rivet 188. The same material and dimension selection advantages discussed above with respect to retainer 170, also apply to retainer 180.

Figures 14A, 14B:
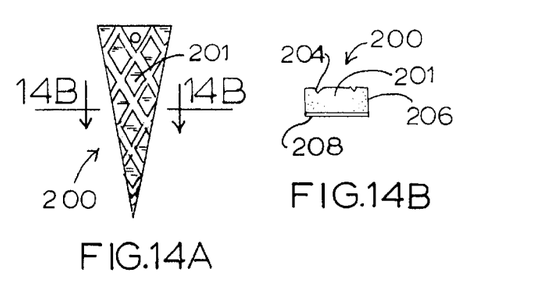
FIG. 14A is a front view of another retainer embodiment.
FIG. 14B is a cross-sectional view through the retainer shown in FIG. 14.

FIG. 14A shows retainer 200 which is similar in shape to retainer 170 already described in relation to FIG. 5. However, sheet member 201 has a criss-cross array of grooves 204, creating a texture for increasing the desired friction characteristics of retainer 200. A cross-section of retainer 200 is shown in FIG. 14B. The thickness of retainer 200 is 3/16 inch and consists of two layers, a thicker foam rubber layer 206 bonded to a relatively thin fabric layer 208 on the side opposite from texturing grooves 204. Some times it is desirable to place a fabric layer against the skin for comfort or sweat-absorption purposes. Other times, it may be preferable to place the textured surface 204 against the skin to provide higher friction, therefore better retention in certain situations.

Figure 15A:
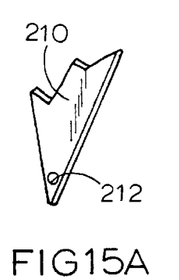
FIGS. 15A and 15B are partial front views of retainers employing handlelike accessories.
Figure 15B:
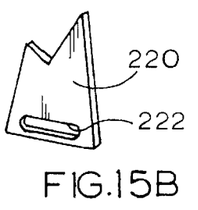

FIGS. 15A and 15B illustrate accessories that can be employed either for better manipulation of the handle of the retainer and/or for decorative purposes. Retainer 210 has a hard bead or button 212 that can be gripped and pulled on when the glasses and retainers are being positioned on a person's head. Similarly, in FIG. 15B, retainer 220 has an elongated miniature handle 222.

Figure 16A:
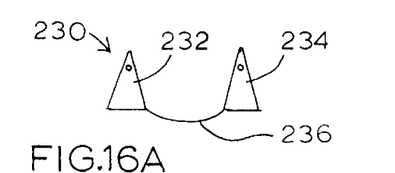
FIGS. 16A and 16B are schematic views of retainer strap devices in accordance with the present invention.
Figure 16B:
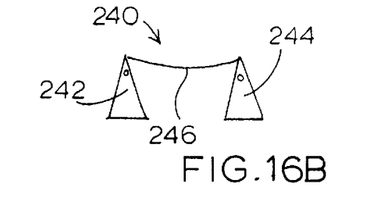

FIGS. 16A and 16B illustrate schematically the concept of connecting a pair of retainers by a strap so that when the glasses are not being worn they can easily be suspended from a person's neck. In FIG. 16A, retainer system 230 includes retainer 232 and retainer 234 which are connected by strap 236. Strap 236 connects to each retainer near the lower part of its handle, i.e., opposite from the upper edge and hole. In contrast, FIG. 16B shows retainer system 240 including retainer 242 and retainer 244 connected by strap 246. Strap 246 is connected to each retainer near the upper edge and hole of the retainer.

Figure 17A:
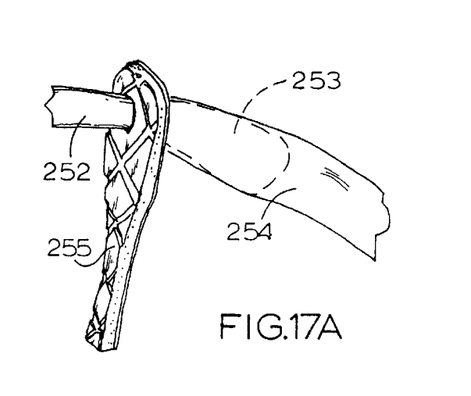
FIGS. 17A–D are perspective views of retainers in accordance with the present invention, being used with a strap on an eyeglass temple.

FIGS. 17A–D show how retainers of the present invention can be combined conveniently with eyeglass straps. In FIG. 17A, retainer 250 is similar to ones previously described, and is attached to eyeglass temple 252. Distal tip 253 (shown in dashed lines) of temple 252 is inserted in one end of eyeglass strap 254. The end of strap 254 meets or at least approaches retainer 250. When the eyeglasses are worn, retainer 250 is tethered behind the user's ear, thereby securing the eyeglasses in wearing position. When the person wants to take the glasses off, he can simply pull the glasses off with one hand so that the glasses suspend from the person's neck. This retention system is advantageous over prior strap devices because it does not rely on a cinch mechanism behind the head to secure the glasses, which can be more difficult to release, requiring two hands and more complex manipulation.

Figure 17B:
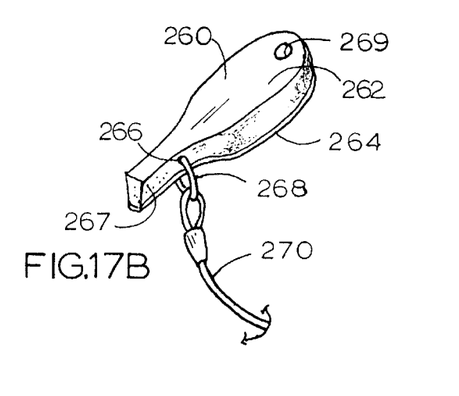

FIG. 17B shows another way of combining a strap with a retainer of the invention. Retainer 260 has front face 262 and back face 264. Hole 266 is formed through handle 267. Ring 268 is attached to hole 266. Hole 266 is transverse to hole 269. Strap 270 is attached to ring 268. Linking strap 270 to the back of retainer 260 keeps the strap away from the ear which is more comfortable to wear.

Figure 17C:
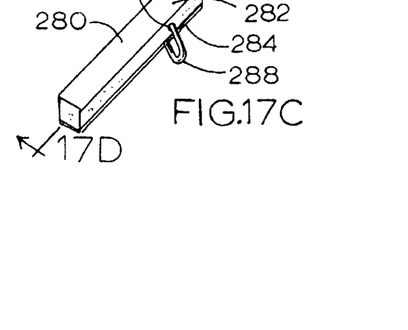

FIG. 17C shows a variation of the retainer shown in FIG. 17B. Retainer 280 is substantially rectangular. Retainer 280 has a front side 282 and a back side 284. Hole 285 is located near the upper edge of retainer 280 for receiving an eyeglass temple. A second hole 286 is transverse to hole 285 for receiving ring 288. Ring 288 permits suspension of a strap from the back side of retainer 280.

Figure 17D:
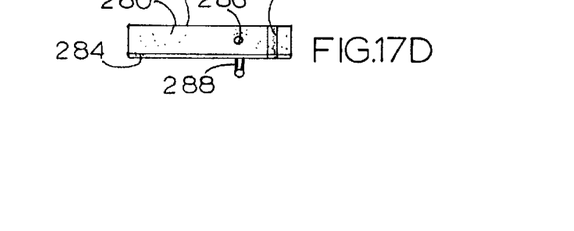

FIG. 17D shows a cross-section through retainer 280.

Figure 18:
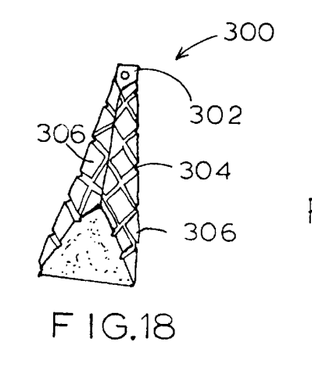
FIGS. 18–23 show alternate retainer embodiments of the invention.

FIGS. 18–23 illustrate further variations of eyeglass retainers of the present invention. In FIG. 18, retainer 300 has a triangular cross-section. Attachment mechanism 302 has a hole for receiving an eyeglass temple. Traction portion 304 has three sides. Two of the sides 306 have a surface configured for contacting the back ear region, one of the sides contacts the head while the other side contacts the back of the ear.

Figures 19, 20:
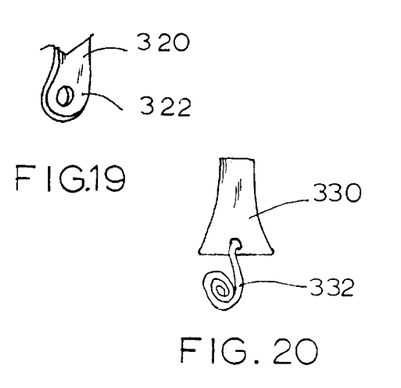

FIG. 19 shows a partial view of a retainer including handle 320 having a hole 322 which is large enough to make handle 320 easier to manipulate.

In FIG. 20, traction portion 330 is connected to a retractable handle 332 which helps to hide the entire retainer behind the ear when handle 332 is not in use.

Figure 21:
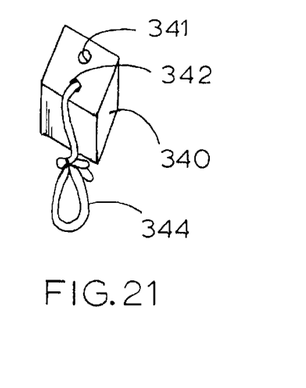

In FIG. 21, traction portion 340 has a first hole 341 for receiving an eyeglass temple and a second hole 342 for securing a piece of string or some other type of looped handle 344.

Figure 22:
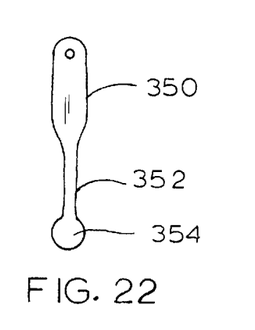

In FIG. 22, traction portion 350 is connected to a relatively narrow handle 352. The distal tip of handle 352 has a widened tab member 354 for making handle 352 easier to manipulate.

Figure 23:
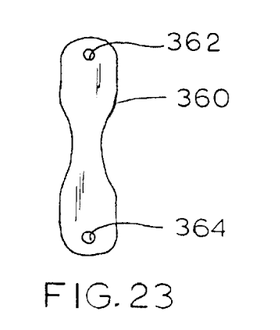

In FIG. 23, retainer 360 has holes of different sizes 362 and 364 located at opposite ends so that different holes can be used for different eyeglass temple dimensions. The design shown in FIG. 23 further increases the versatility of the retainer to be used on different types of glasses.

Figure 24A:
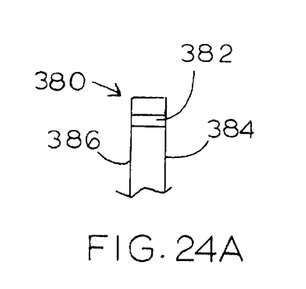
FIG. 24A is a cross-sectional side view through a hole in a retainer according to a preferred embodiment of the invention.
Figure 24B:
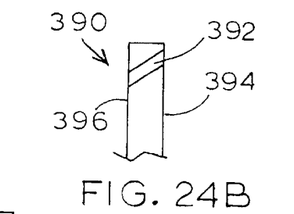
FIG. 24B is a cross-sectional view through a retainer having a modified hole configuration.

FIGS. 24A and 24B are side cross-sectional views through retainers, each having a different hole configuration. In FIG. 24A, retainer 380 has a hole 382 connecting planar front and back faces 384 and 386. Hole 382 is perpendicular to faces 384 and 386. In contrast, retainer 390 in FIG. 24B has hole 392 connecting front and back planar faces 394 and 396. Hole 392 is obliquely angled relative to faces 394 and 396. Angled hole 392 causes retainer 390 to hang in a rearward direction which may be advantageous for some applications.

Figure 25:
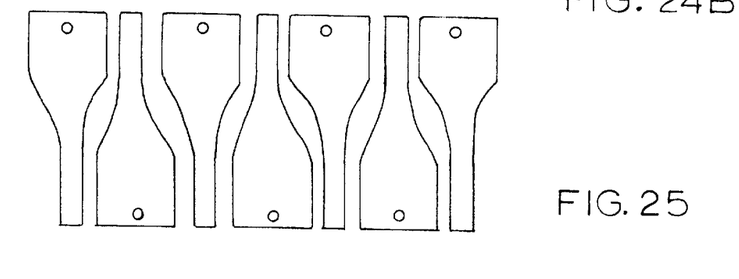
FIG. 25 is a schematic view of a die-cut pattern for producing retainers.

Most of the retainers described above are manufactured, preferably, by die-cutting retainers out of a neoprene sheet. For example, FIG. 25 shows a die-cut pattern for generating retainers out of a foam rubber sheet. Alternatively the retainers can also be produced by conventional molding processes.

Figure 26A:
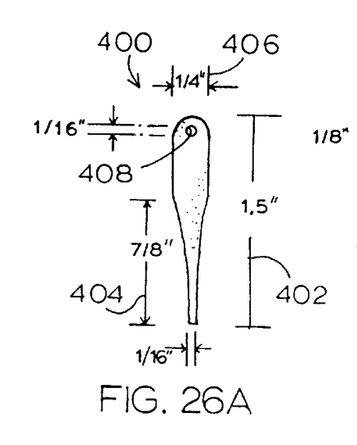
FIGS. 26A–C are front views of alternative retainer designs.
Figure 26B:
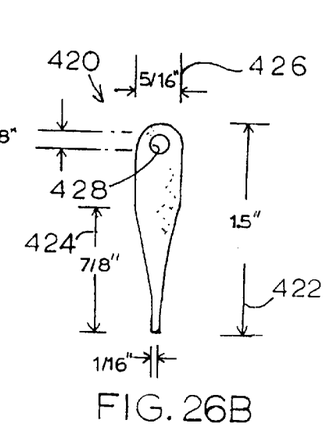
Figure 26C:
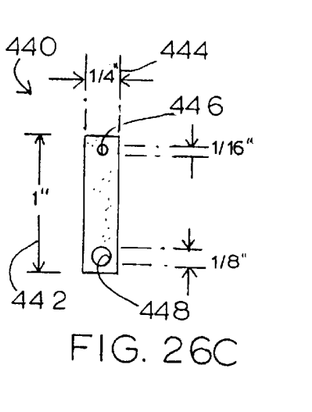

FIGS. 26A–C show some preferred embodiments of the invention. In FIG. 26A, retainer 400 has a length 402 of 1½ inches. The tapering handle portion has a length 404 of ⅞ inch. The upper traction portion of retainer 400 has a width 406 of ¼ inch. Hole 408 has a diameter of 1/16 inch. The material used to make retainer 400 is neoprene, with fabric on one side, ¼ inch thick, 931 knobby, R1400n, from Rubatex Corp.

FIG. 26B shows a different design. Retainer 420 has a length 422 of 1½ inches. The tapering handle portion has a length 424 of ⅞ inch. The upper traction portion of retainer 420 has a width 426 of 5/16 inch. Hole 428 has a diameter of ⅛ inch. The material used to make retainer 420 is neoprene, with fabric on one side, 931 knobby, G-231-N from Rubatex Corp.

FIG. 26C shows another embodiment. Retainer 440 has a length 442 of 1 inch and a width 444 of ¼ inch. Holes of different sizes are provided at opposing ends so that the retainer can be used on a wide range of temple dimensions. Hole 446 has a diameter of 1/16 inch. Hole 448 has a diameter of ⅛ inch.

Many useful modifications of the invention, as described above, are possible. For example, a product that will be helpful in optometry includes a set of neoprene sheets that are partially pre-cut, and finally cut with scissors to custom-fit a particular person and frame dimension. The pre-cut sheets could look like retainer 150 in FIG. 10. Retainer 150 would then be trimmed to meet the specific needs of a particular person.

I claim:

1. An eyeglass retention device comprising
   a pair of tethers, each tether having an upper edge, and an attachment mechanism including a hole near the upper edge for receiving an eyeglass temple, and
   each tether having an elastomeric traction portion descending from the hole of the attachment mechanism, wherein a front-to-back direction is defined parallel to an axis that threads the center of the hole, the traction portion being freely yielding in the front-to-back direction so that the tether can grip by friction a wearer's back ear region without concentrating significant forward pressure behind the wearer's ear.

2. The device of claim 1, wherein each traction portion has a front face that is substantially planar so the tether tends to spread pressure out across the back ear region.

3. The device of claim 1, wherein each attachment mechanism has a hole in a foam rubber sheet, the traction portion being formed in the same foam rubber sheet.

4. The device of claim 3, wherein each hole has a depth of about 1/8 inch to 3/8 inch and a diameter of about 1/16 inch to 3/16 inch.

5. The retainers of claim 3, wherein each hole has an unstretched area and is resiliently stretchable around a temple portion having a cross-sectional area at least about five times the unstretched area.

6. The retainers of claim 3, wherein each hole is defined by a circumferential foam rubber wall having a surface area of at least about 0.03 in$^2$.

7. The device of claim 1, further comprising a handle descending from each traction portion for pulling the tether into position behind a wearer's ear, wherein the handle has a smaller width than the traction portion.

8. The device of claim 1, wherein each traction portion has a pliable foam rubber surface textured to grip and conform comfortably to a wearer's back ear region.

9. The device of claim 8, wherein at least a portion of the surface has one or more of the following textures: (a) open cell foam, (b) criss-cross grooves, (c) parallel grooves, (d) protrusions in waffle configuration, and (e) random roughness.

10. The device of claim 1, wherein each tether has a round cross-section.

11. The device of claim 1, wherein the attachment mechanism and the traction portion are made of different materials.

12. The device of claim 1, wherein the pair of tethers are connected by a strap member.

13. The device of claim 1, wherein each tether has a front side and a back side, the hole being oriented substantially perpendicular to the front and back sides.

14. The device of claim 1, wherein each retainer has a front side and a back side, the hole being oriented to form an oblique angle in relation to the front and back sides.

15. The device of claim 1, wherein each retainer is a molded part.

16. Eyewear comprising
a pair of lenses supported in a front frame member,
a pair of temples connected to opposite ends of the frame member, and extending rearward for bracing the eyeglasses on a wearer's head, and
a pair of retainers, each retainer having an elastomeric traction portion descending from one of the temples, wherein the traction portion is freely yielding in a front-to-back direction, and has a surface that grips a wearer's back ear region.

17. The eyewear of claim 16, further comprising a strap connecting the temples.

18. The device of claim 16, wherein each retainer has an attachment mechanism including a hole for receiving an eyeglass temple.

19. An eyeglass retention device comprising
a pair of retainers, each retainer having an upper edge, an attachment mechanism near the upper edge including a hole for receiving a temple on a pair of eyeglasses, and an elastomeric traction portion descending from the temple, wherein each traction portion has a width and a thickness, the width being substantially equal to or greater than the thickness.

20. The device of claim 19, wherein the retainer is a substantially flat piece of foam rubber.

21. The device of claim 19, wherein each traction portion has a front-to-back thickness less than or equal to about 3/8 inch.

22. An eyeglass retention device comprising
a pair of retainers, each retainer having an upper edge, an attachment mechanism near the upper edge including a hole for receiving a temple on a pair of eyeglasses, and a resiliently flexible traction portion having a front face descending from the hole, wherein the front face is substantially planar.

23. The device of claim 22, wherein the traction portion has no pre-formed concave shape.

24. The device of claim 22, wherein the traction portion is freely yielding in a front-to-back direction so that the retainers do not exert significant direct forward pressure on the back ear region.

25. An eyeglass retention device comprising
an elongate member having a long axis running between top and bottom opposite ends, a hole near the top end for receiving an eyeglass temple, and a handle near the bottom end, wherein the member has a surface that tends to grip on skin, and is resiliently stretchable along the long axis so that when the member is stretched from an eyeglass temple into a wearer's back ear region by pulling on the handle, the member grips and maintains a partially stretched orientation causing a front-to-back pulling force to be exerted on the temple without concentrating significant forward pressure behind a wearer's ear when used to secure eyeglasses on a wearer's face.

26. Eyewear comprising
a pair of eyeglasses including two temples, and
a pair of foam rubber sheet members, each sheet member being defined between substantially planar and parallel front and back sides, wherein each sheet member has a hole connecting the front side to the back side, each of the temples being inserted through the hole of one of the sheet members so that the front sides of the sheet members face generally forward when the eyeglasses are worn.

27. The eyewear of claim 26, wherein the front and back sides of each sheet member define a front-to-back direction, the sheet member being resiliently flexible in the front-to-back direction so that each retainer can grip a wearer's back ear region without concentrating significant forward pressure behind the wearer's ear.

28. The eyewear of claim 26, wherein the hole in each retainer has a depth of between about 1/8 inch to 3/8 inch, and a diameter of between about 1/16 inch to 3/16 inch.

29. The eyewear of claim 26, wherein the hole is resiliently stretchable around an area at least about 5 times an area defined by the hole.

30. The eyewear of claim 26, wherein each sheet member has a length that is limited so that the sheet member does not extend significantly beyond the circumference of a wearer's ear.

31. The eyewear of claim 26, wherein each sheet member has a width that is limited so that the sheet member does not cause visible displacement of the ear from its normal position.

32. The eyewear of claim 26, wherein each sheet member has a narrowing width descending down from the hole.

33. The eyewear of claim 26, wherein each sheet member has fabric on the back side and a rubber surface on the front side.

34. An eyeglass retention system comprising a pair of tethers, each tether having an upper edge and an attachment mechanism including a hole near the upper edge for receiving an eyeglass temple, and each tether having an elastomeric traction portion below the attachment mechanism, wherein the hole of each tether defines a front-to-back direction, the traction portion of each tether having no significant stiffness in the respective front-to-back direction.

35. Retainers for eyeglasses comprising a pair of tethers, each tether having an upper edge, and an attachment mechanism including a hole near the upper edge for receiving an eyeglass temple, and each tether having an elastomeric traction portion descending from the hole of the attachment mechanism, the traction portion being made of a flat elastomeric sheet, the sheet having a thickness, oriented in a front-to-back direction, of less than about 3/8 inch, and a width equal to or greater than the thickness.

* * * * *